(12) United States Patent
Ruffa

(10) Patent No.: US 11,237,337 B1
(45) Date of Patent: Feb. 1, 2022

(54) NON-ROTARY JOINT

(71) Applicant: The United States of America as represented by the Secretary of the Navy, Newport, RI (US)

(72) Inventor: Anthony A Ruffa, Hope Valley, RI (US)

(73) Assignee: The United States of America as represented by the Secretary of the Navy

( * ) Notice: Subject to any disclaimer, the term of this patent is extended or adjusted under 35 U.S.C. 154(b) by 0 days.

(21) Appl. No.: 17/075,796

(22) Filed: Oct. 21, 2020

(51) Int. Cl.
    *G02B 6/36*     (2006.01)
    *G02B 6/38*     (2006.01)
    *H02G 1/06*     (2006.01)

(52) U.S. Cl.
    CPC ......... *G02B 6/3604* (2013.01); *G02B 6/3825* (2013.01); *H02G 1/06* (2013.01)

(58) Field of Classification Search
    CPC .................................................. G02B 6/3604
    See application file for complete search history.

(56) References Cited

U.S. PATENT DOCUMENTS

| 4,389,645 | A | * | 6/1983 | Wharton | ................ | H04B 10/25 340/854.7 |
| 9,939,600 | B2 | * | 4/2018 | Holmberg | .............. | H02G 11/02 |

* cited by examiner

*Primary Examiner* — Omar R Rojas
(74) *Attorney, Agent, or Firm* — James M. Kasischke; Michael P. Stanley

(57) ABSTRACT

A non-rotary joint for connecting a static component to a rotatable component includes an adapter on a rotatable part. A motor is joined to rotate the rotatable part. A connector is joined to the static component. The connector can be moved by an actuator from a first position joined with the adapter to a second position positioned away from the adapter. A controller is joined to control the motor and the actuator. The controller signals the actuator to move to the second position when the motor is activated and signals the actuator to move to the first position when said motor is deactivated. In a practical embodiment, the non-rotary joint makes a connection between a static signal carrier and a cable on a winch drum.

13 Claims, 4 Drawing Sheets

NON-ROTARY JOINT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention is directed to a joint between a cable and a rotating machine. More particularly the invention is directed toward a fiber optic cable and a rotating machine.

(2) Description of the Prior Art

Slip rings are used to establish a connection between a non-rotating component and a rotating component. A slip ring allows communication between a non-rotating signal carrier and a rotating component like a wheel or a winch drum. In towed fiber optic systems, fiber optic slip rings are used to join shipboard components to deployable towed components. The fiber optic slip ring is a fiber optic rotary joint, which provides an optical path for a signal through a rotating interface.

A fiber optic rotary joint requires two fiber ends in close alignment. Stringent alignment and fiber end preparation requirements are necessary to avoid excessive optical losses in the joint. Losses can also be reduced by providing a fluid having a matched optical index of refraction in the gap between the component. It is also known to use gradient-index (GRIN) lenses and other methods for loss reduction.

Even after extensive efforts to minimize losses, a fiber optic rotary joint typically leads to an optical loss of approximately 1.5 dB. This can adversely affect both sensing and telemetry functions through the fiber optic. Sensing applications are particularly susceptible. In some applications, special tuning is critical to minimize the effect of slip ring losses; otherwise the measurement error will become unacceptably high.

In some applications, a fiber optic rotary joint is only used because of availability and convenience. There is no need for data communication while the rotating component is operating. With a towed fiber optic sensor, signals are not being transmitted or received while the sensor is being deployed from a winch. These sensors are designed to operate under steady-state towing conditions. Deployment causes changes to the towed fiber optic sensor that prevent collection of accurate data. Fiber optic rotary joints are used mainly because they were developed for other applications and are commercially available, not because data acquisition is required during winch operation.

A fiber optic rotary joint integrated into a winch is larger, more complex, less reliable, and leads to more optical losses than a non-rotary fiber optic connection. When multiple telemetry channels are required, the size, complexity, and cost of the fiber optic rotary joint increases significantly. These issues also limit the number of slip ring channels that can be integrated into a winch, which often limits the overall system design.

There is thus a need to provide a signal bearing connection between a static cable and a rotating part when signal communication is not necessary while the rotating part is in motion.

SUMMARY OF THE INVENTION

It is a first object to provide a robust signal connection between a static cable and a part that is capable of rotating.

Another object is to provide such a connection that minimizes signal losses.

Accordingly, there is provided a non-rotary joint for connecting a static component to a rotatable component. The non-rotary joint includes an adapter on a rotatable part. A motor is joined to rotate the rotatable part. A connector is joined to the static component. The connector can be moved by an actuator from a first position joined with the adapter to a second position positioned away from the adapter. A controller is joined to control the motor and the actuator. The controller signals the actuator to move to the second position when the motor is activated and signals the actuator to move to the first position when said motor is deactivated. In a practical embodiment, the non-rotary joint makes a connection between a static signal carrier and a cable on a winch drum.

BRIEF DESCRIPTION OF THE DRAWINGS

Reference is made to the accompanying drawings in which are shown an illustrative embodiment of the invention, wherein corresponding reference characters indicate corresponding parts, and wherein.

DETAILED DESCRIPTION OF THE INVENTION

A non-rotary joint is provided herein. It operates in a rotary system (i.e., a winch), but it does not itself rotate during signal transmission. The joint is integrated into the rotary system and automated so that the rotary portions of the system cannot rotate until the connection is disengaged. The connection cannot be re-established until the rotary portions are locked again. Because the joint does not attempt to support signal transmission during rotation, complexity, cost, and signal losses are greatly reduced.

Figure 1:
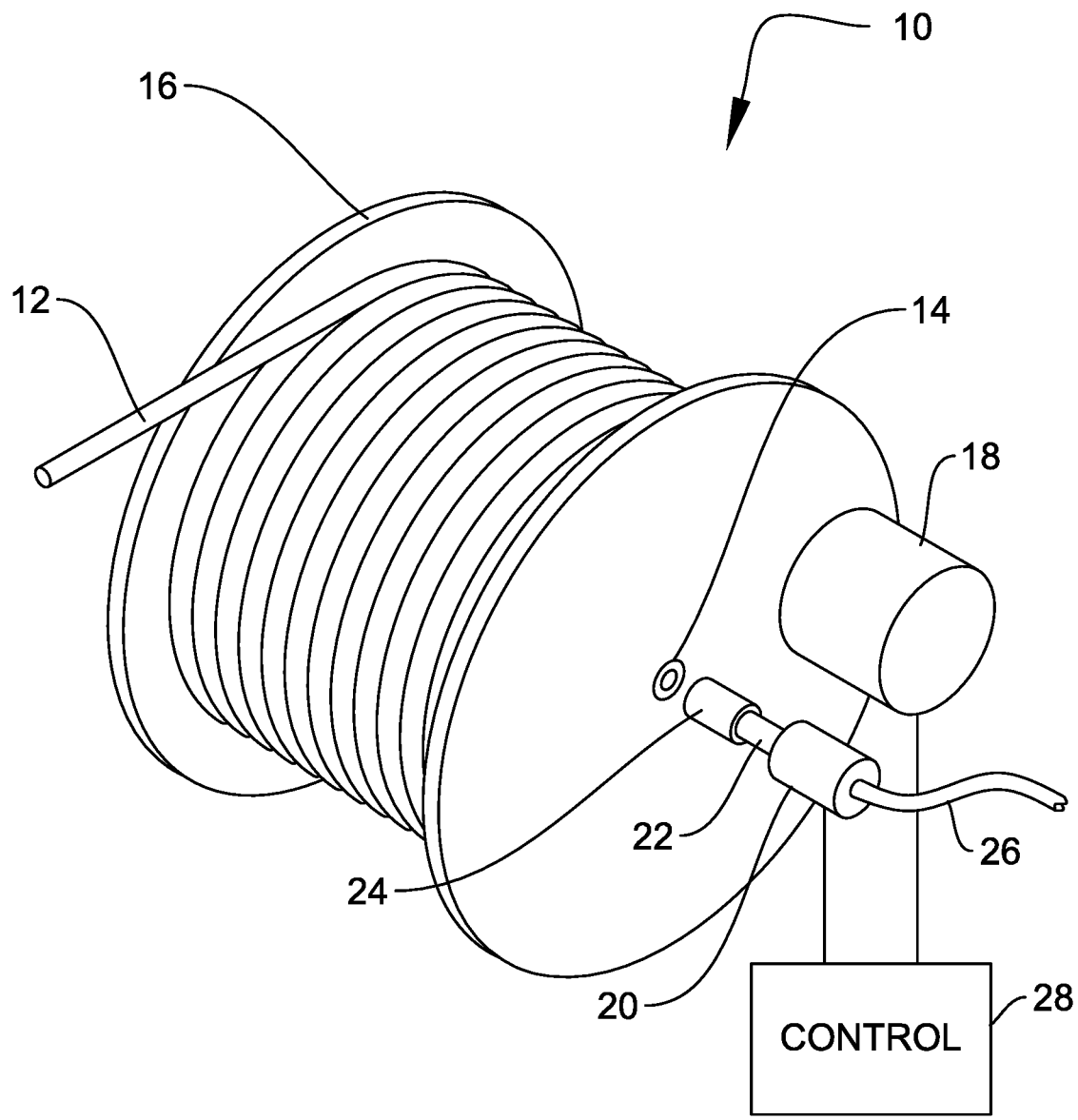
FIG. 1 is an isometric diagram of a first position of a first implementation.
Figure 2:
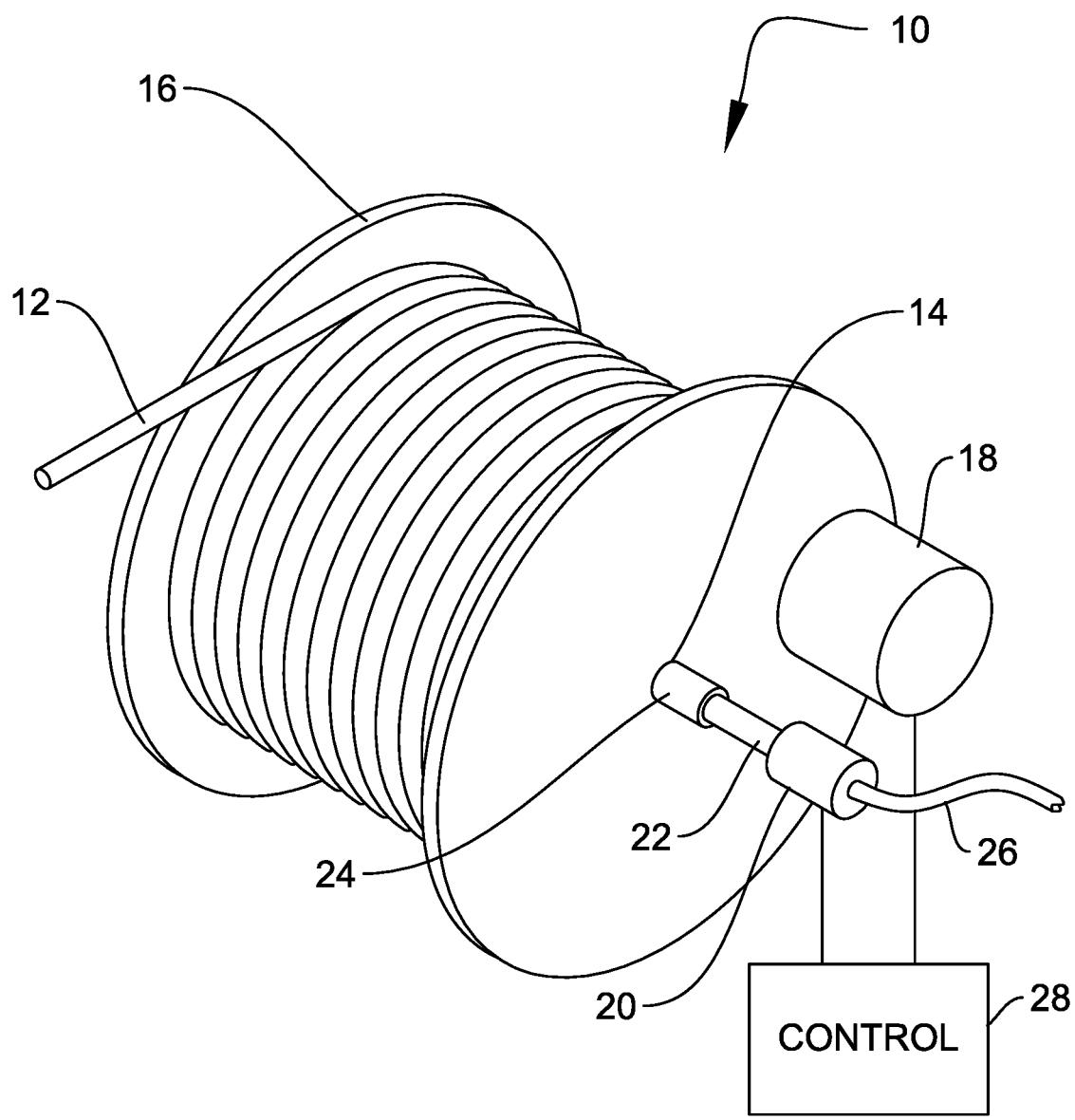
FIG. 2 is an isometric diagram of a second position of a first implementations.

FIG. 1 illustrates a first position of a first implementation. A second position of the first implementation is shown in FIG. 2. A winch 10 is provided for deploying a communication cable 12. Communication cable 12 can be an electronic or optical sensor or other signal bearing cable. Communication cable 12 is connected to an adapter 14 at the hub of the winch drum 16. Winch 10 includes a motor 18 for rotating winch drum 16 during deployment and retrieval of communication cable 12. Winch 10 can have other mechanical components related to the motor 18 and winch control such as a gearbox, a clutch, and a brake.

Non-rotary joint includes an actuator 20 joined to linearly actuate a shaft 22. Actuator 20 is preferably an electromechanical actuator such as a electromechanical solenoid;

however, other actuating means can be used. Shaft 22 has a push-pull connector 24 positioned at the end of shaft 22 distal from actuator 20. Push-pull connector 24 is capable of mating with adapter 14 on winch drum 16 for signal communications. Shaft 22 is hollow to allow a signal carrier 26 such as a fiber optic cable to be positioned therein. Signal carrier 26 is joined to push-pull connector 24. A controller 28 is joined to motor 18 and actuator 20 to coordinate movement of motor 18 and actuator 20.

FIG. 1 illustrates the first implementation while communication cable 12 is being deployed by winch 10. Controller 28 coordinates between actuator 20 and motor 18. While motor 18 is energized to rotate winch drum 16, actuator 20 is controlled to retract shaft 22 and connector 24.

In this implementation, a static component such as signal carrier 26 can be joined to a rotatable component such as communication cable 12. Communication cable 12 is provided on a rotatable part, winch drum 16. During rotation of the rotatable part, the static component is not connected for signal transmission to the rotatable component. Once deployment or retrieval is complete, connector 24 is joined to adapter 14, and the static component is connected to the rotatable component for signal transmission.

FIG. 2 illustrates the first implementation in a second position while communication cable 12 is static in a deployed or retracted configuration. Controller 28 detects motor 18 state to insure that winch drum 16 is not rotating. Controller 28 provides a control signal to actuator 20 to extend shaft 22 and join connector 24 with adapter 14. In this position, signals from communication cable 12 can travel through adapter 14 to connector 24 and then to signal carrier 26.

Figure 3:
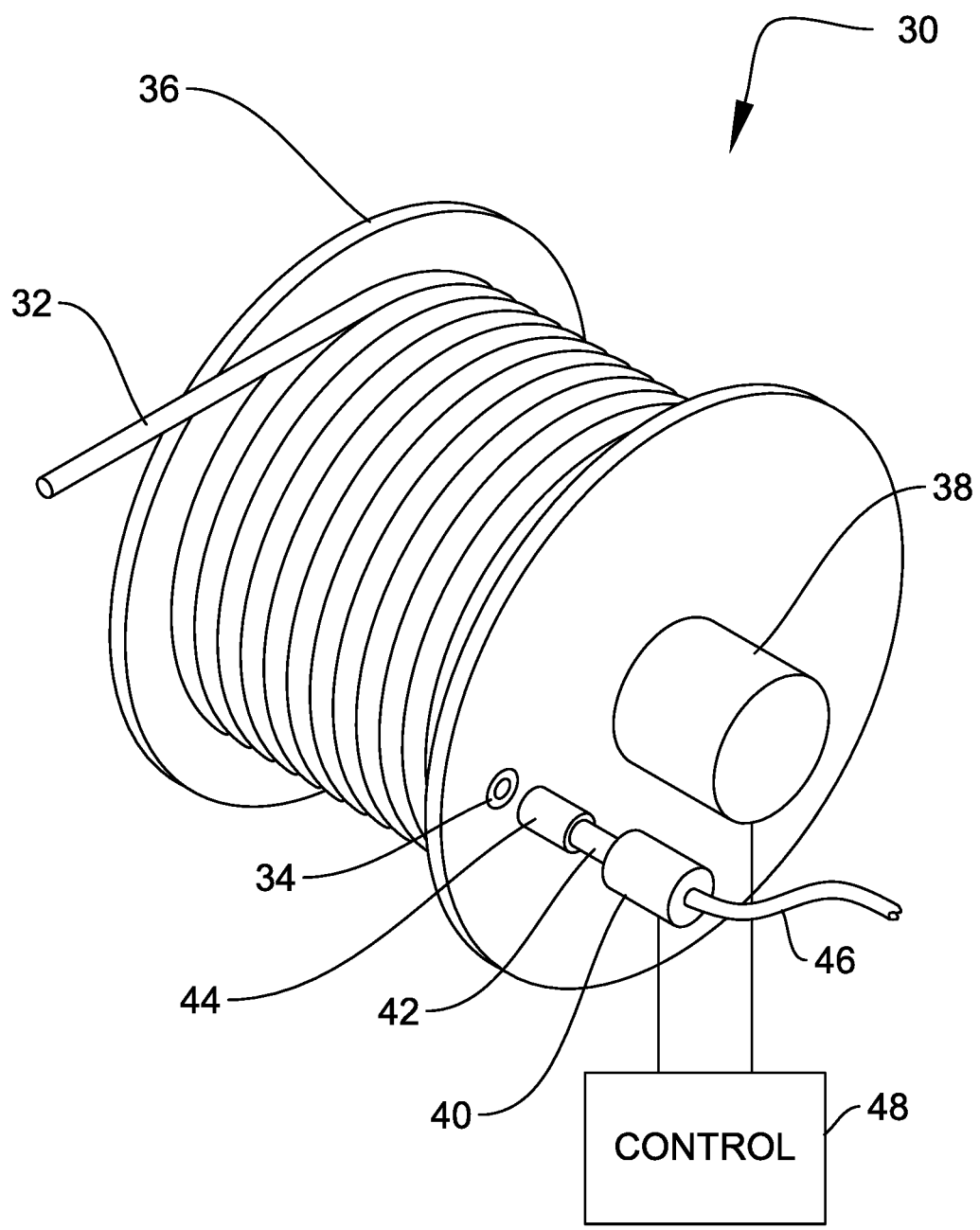
FIG. 3 is an isometric diagram of a first position of a second implementation.
Figure 4:
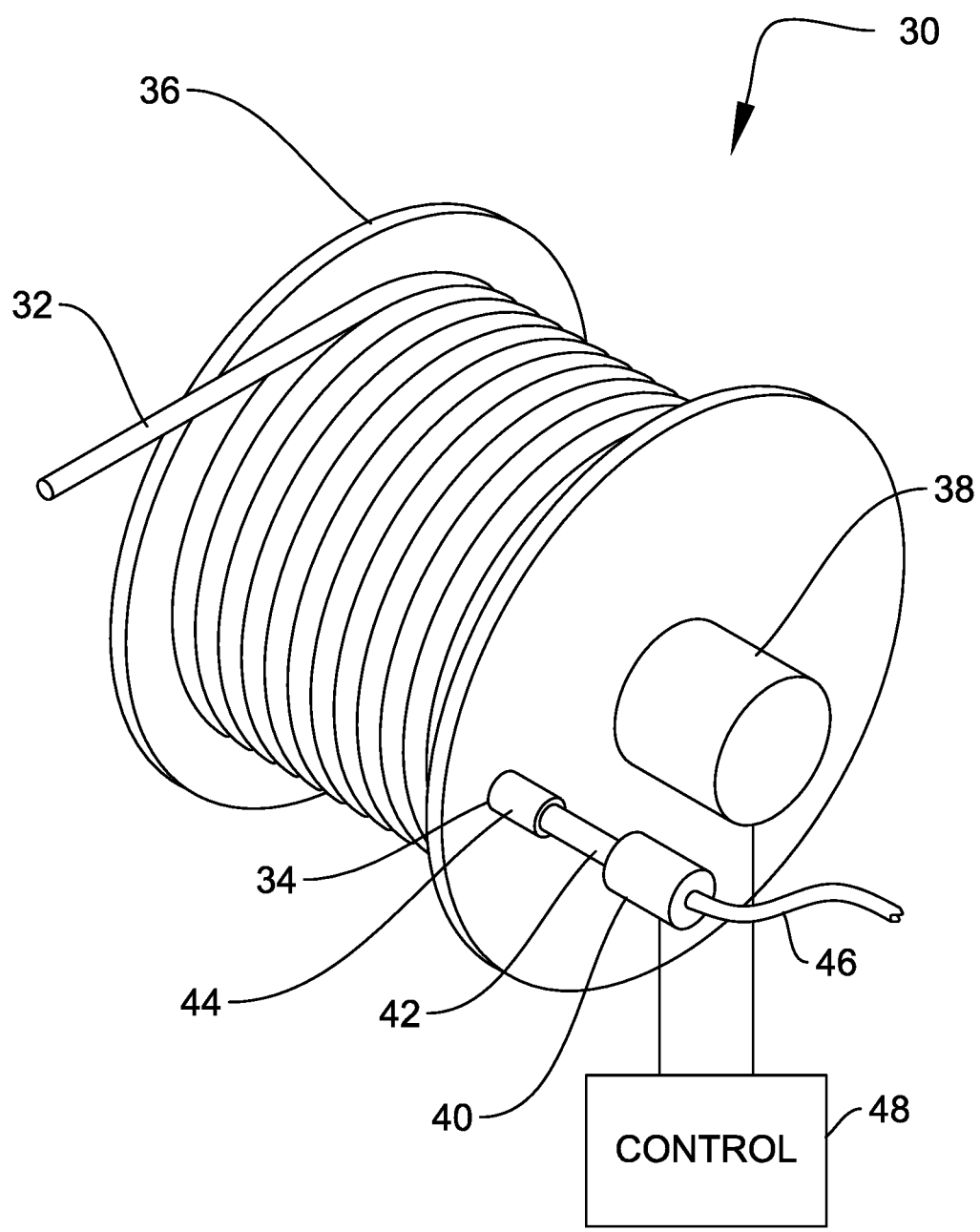
FIG. 4 is an isometric diagram of a second position of a second implementations.

FIG. 3 and FIG. 4 illustrate the second implementation. A winch 30 has a communication cable 32 joined to an adapter 34 on a winch drum 36. Adapter 34 is positioned radially away from the winch drum 36 hub. Motor 38 is joined to winch drum 36 to rotate drum 36.

Non-rotary joint is positioned radially away from winch drum 36 hub. Non-rotary joint radial positioning corresponds to the positioning of adapter 34. Non-rotary joint includes an actuator 40, a shaft 42, and a connector 44. As with the other implementation, a signal cable 46 is joined to connector 44 through hollow shaft 42. A controller 48 is joined to motor 38 and actuator 40.

FIG. 3 shows a first position of the second implementation. This position allows rotation of winch drum 36 by motor 38 such as during deployment of communication cable 32. Controller 48 controls actuator 40 to retract shaft 42 and remove connector 44 from engagement with adapter 34.

FIG. 4 shows a second position of the second implementation. This position allows communication through communication cable 32, adapter 34, connector 44, and signal cable 46. In order to align connector 44 with adapter 34, winch drum 36 must have a particular angular orientation, aligning adapter 34 with non-rotary joint apparatus. This can be accomplished by using a stepper motor as motor 38 to allow precise angular positioning of the mechanically-joined winch drum 36. Alternatively, mechanical position limiting means can be used. This can include a ratchet joined to drum 36 or motor 38 limiting the angular positioning of drum 36. A brake can also be used for these purposes. Other known apparatus can provide this function. After aligning connector 44 with adapter 34, controller 48 can activate actuator 40 extending shaft 42, and joining connector 44 to adapter 34. This implementation will allow use of multiple channel signals because the different signal paths will be aligned when aligning the connector and adapter.

Current static fiber optic connectors can be joined together without cleaning or other special treatment with a very low insertion loss. One such connector is an LSH or E2000™ fiber optic connector. (E2000 is a trademark of the Diamond Company for a push-pull fiber optic connector.) Other push-pull fiber optic and electronic connectors can be similarly used.

To summarize this invention, the system is integrated into the winch or other rotatable part so that it automatically disengages the connection before the winch is unlocked, and it automatically reestablishes the connection after the deployment is completed and the winch is locked again. This reduces the optical loss to approximately 0.1 dB, which is typical for a plug-in optical connection. In this invention, fiber optic connections are disengaged and re-established quickly in an automated way during winch operation without any operator intervention. This means that a towed system can be rapidly extended or retracted when necessary without additional delays (or without the operator even noticing that the connections were disengaged and re-established). Once the winch is locked again, data acquisition can begin almost immediately.

The described apparatus provides a connection between a static signal source and rotating machinery with low losses through what is essentially a static connector. It is much less expensive, requires much less space, is more reliable and less complicated, and has the potential to support many more fiber optic channels than a conventional rotary joint because of the simplicity of its geometry and operation.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive, nor to limit the invention to the precise form disclosed; and obviously, many modification and variations are possible in light of the above teaching. Such modifications and variations that may be apparent to a person skilled in the art are intended to be included within the scope of this invention as defined by the accompanying claims.

What is claimed is:

1. An apparatus for joining a signal conductor from a static component to a rotatable component comprises:

a rotatable part joined to the rotatable component and capable of rotating about a center of rotation;

an adapter positioned on said rotatable part and joined to the rotatable component;

a motor joined to said rotatable part to rotate said rotatable part;

a connector joined to the static component;

an actuator joined to said connector to move said connector from a first position joined with said adapter to a second position positioned away from said adapter; and a controller joined to control said motor and said actuator, said controller signaling said actuator to move to the second position when said motor is activated and signaling said actuator to move to the first position when said motor is deactivated.

2. The apparatus of claim 1, wherein:
said adapter is positioned at the center of rotation of said rotatable part; and
said connector is axially aligned with the center of rotation of said rotatable part.

3. The apparatus of claim 1, wherein:
said adapter is positioned radially away from the center of rotation of said rotatable part; and
said connector is axially aligned with said adapter when said rotatable part is rotated to a specific angular position.

4. The apparatus of claim 3, wherein said controller controls said motor to rotate said rotatable part to the specific angular position.

5. The apparatus of claim 3, wherein said rotatable part is mechanically controlled to stop at the specific angular position.

6. The apparatus of claim 3, wherein said connector and said adapter are configured to carry a multichannel signal.

7. The apparatus of claim 1, wherein the static component is a fiber optic cable and the rotatable component is a fiber optic sensor.

8. A system for deploying, retrieving, and communicating with a fiber optic sensor from a fiber optic cable comprising:
a winch drum for carrying the fiber optic sensor and capable of deploying the fiber optic sensor by rotating about a central axis;
an adapter positioned on said winch drum and joinable to the fiber optic sensor;
a motor joined to said winch drum to rotate said winch drum;
a connector joinable to the fiber optic cable;
an actuator joined to said connector to move said connector from a first position joined with said adapter to a second position positioned away from said adapter; and
a controller joined to control said motor and said actuator, said controller signaling said actuator to move to the second position when said motor is activated and signaling said actuator to move to the first position when said motor is deactivated.

9. The apparatus of claim 8, wherein:
said adapter is positioned at the central axis of said winch drum; and
said connector is axially aligned with the central axis of said winch drum.

10. The apparatus of claim 8, wherein:
said adapter is positioned radially away from the central axis of said winch drum; and
said connector is axially aligned with said adapter when said winch drum is rotated to a specific angular position.

11. The apparatus of claim 10, wherein said controller controls said motor to rotate said winch drum to the specific angular position.

12. The apparatus of claim 10, wherein said winch drum is mechanically controlled to stop at the specific angular position.

13. The apparatus of claim 8, wherein said connector and said adapter are configured to carry a multichannel signal.

\* \* \* \* \*